United States Patent
Menditto et al.

(10) Patent No.: US 8,589,974 B2
(45) Date of Patent: Nov. 19, 2013

(54) ELECTRONIC ADVERTISING USING DISTRIBUTED DEMOGRAPHICS

(75) Inventors: Louis F. Menditto, Raleigh, NC (US); Kenneth Davidson, Frisco, TX (US); Richard L. Gray, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1162 days.

(21) Appl. No.: 12/015,140

(22) Filed: Jan. 16, 2008

(65) Prior Publication Data
US 2009/0182619 A1 Jul. 16, 2009

(51) Int. Cl.
*H04N 7/10* (2006.01)

(52) U.S. Cl.
USPC .............. 725/34; 725/32; 725/14; 725/110

(58) Field of Classification Search
USPC ................................ 725/34, 32, 14, 110
See application file for complete search history.

(56) References Cited

U.S. PATENT DOCUMENTS

| | | | |
|---|---|---|---|
| 6,698,020 B1 * | 2/2004 | Zigmond et al. | 725/34 |
| 6,981,029 B1 | 12/2005 | Menditto et al. | |
| 7,051,351 B2 * | 5/2006 | Goldman et al. | 725/34 |
| 7,657,594 B2 | 2/2010 | Banga et al. | |
| 2007/0113284 A1 | 5/2007 | O'Rourke et al. | |
| 2008/0235351 A1 | 9/2008 | Banga et al. | |
| 2008/0262901 A1 | 10/2008 | Banga et al. | |
| 2008/0263633 A1 | 10/2008 | Banga et al. | |
| 2008/0288658 A1 | 11/2008 | Banga et al. | |
| 2009/0049192 A1 | 2/2009 | Banga et al. | |
| 2009/0282468 A1 | 11/2009 | Banga et al. | |
| 2009/0327488 A1 | 12/2009 | Sampat et al. | |

FOREIGN PATENT DOCUMENTS

CN 1301458 A 6/2001

OTHER PUBLICATIONS

Unpublished U.S. Appl. No. 11/861,896, filed Sep. 26, 2007, Menditto, et al.
Chinese Office Action from corresponding Chinese Patent Application No. CN200980102271.5, 18pp, Aug. 14, 2012.

* cited by examiner

*Primary Examiner* — Daniel Felten
(74) *Attorney, Agent, or Firm* — Brinks Hofer Gilson & Lione

(57) ABSTRACT

In one embodiment, at least one portion of a request for an electronic advertisement is received. The request includes an indicator indicative of one of a plurality of demographic servers. The at least one portion is analyzed. The at least one portion includes data of a user. Demographic information is identified as a function of the user data. A request for a selection of the electronic advertisement as a function of the demographic information is transmitted.

23 Claims, 4 Drawing Sheets

ELECTRONIC ADVERTISING USING DISTRIBUTED DEMOGRAPHICS

BACKGROUND

The present disclosure relates generally to data communication.

Advertising is an important tool to sustain a healthy and growing economy. Many forms of advertising are employed everyday. Specifically, electronic advertisements associated with webpages, data communication, and various electronic media are viewed by users around the world. For example, a cellular ("cell") phone, personal digital assistant ("PDA"), or computer user may enter a website or logon to a blog or communication service and receive several electronic advertisements.

However, in some systems, the electronic advertisements are not selected based on the user or the user device. For example, random advertisements associated with a website may be provided by an advertisement provider. Such random advertisements may not benefit from personal preferences of users.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

Figure 1:
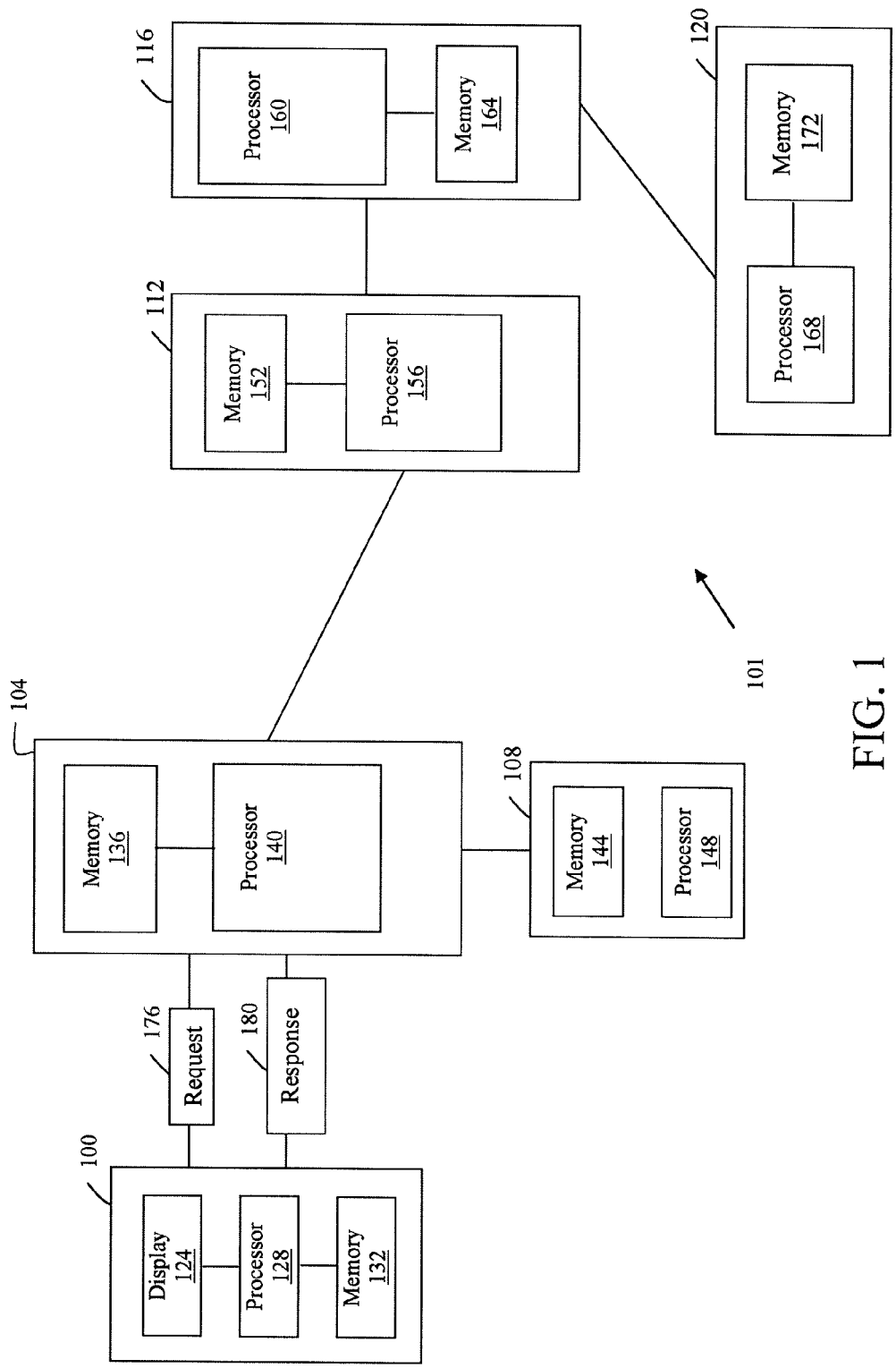
FIG. 1 illustrates one embodiment of a data communication system for distributed demographic electronic advertising.

By way of introduction, the example embodiments described below include a data communication device and/or system and a method for distributed demographic electronic advertising. The system includes a device requesting data content, a device receiving or intercepting the request, and at least one of a plurality of distributed demographic devices. Electronic advertisements are selected based on data included in the request and information from a distributed demographic device.

According to a first aspect, at least one portion of a request for an electronic advertisement is received. The request includes an indicator indicative of one of a plurality of demographic servers. The at least one portion is analyzed. The at least one portion includes data of a user. Demographic information is identified as a function of the user data. A request for a selection of the electronic advertisement as a function of the demographic information is transmitted.

According to a second aspect, a request for content is received. The content is capable of including an electronic advertisement. Data is included in the request for the content. The included data corresponds to user information and is indicative of a first of a plurality of devices. Each of the plurality of devices includes separate demographic information, respectively. A selected electronic advertisement is received as a function of the included data.

According to a third aspect, a device of a plurality of devices is provided. Each of the plurality of devices includes separate demographic information. The device is operable to receive at least one portion of a request for an electronic advertisement as a function of an indicator in the request. The at least one portion includes data indicative of a user associated with the request. The device is further operable to identify demographic information as a function of the data.

According to a fourth aspect, a device is operable to monitor data communication between a user device and a server. The device is further operable to receive a request for content. The content is capable of including an electronic advertisement. The device is further operable to include data in the request for the content. The included data is indicative of one of a plurality of demographic servers.

According to a fifth aspect, means for receiving at least one portion of a request for an electronic advertisement is provided. Means for analyzing the at least one portion is provided. The at least one portion includes data of a user. Means for identifying demographic information of the user as a function of the user data is provided. Means for transmitting a request for a selection of the electronic advertisement as a function of the demographic information is provided.

The present invention is defined by the following claims, and nothing in this section should be taken as a limitation on those claims. Further aspects and advantages of the invention are discussed below in conjunction with the preferred embodiments.

Example Embodiments

Demographic data is distributed among several demographic servers. The demographic data is autonomous to each carrier so that it is protected and controlled by the carrier. For example, the demographic data is accessible via an obscure key or encrypted data inserted into a header so that entities outside the carrier cannot directly contact the subscriber. The obscure key or encrypted data may be created algorithmically or configured per subscriber in the carrier's subscriber database. The obscure key or encrypted data can be transmitted via Remote Authentication Dial In User Service ("RADIUS") to a network access server. The network access server inserts the obscure key or encrypted data into an outgoing data request. A RADIUS attribute may carry the obscure key or encrypted data to the network access server when the subscriber connects to the network.

A distributed demographic server to be queried by the obscure key or encrypted data is identified by inserting its IP address within a header of the request. The receiving origin server or advertisement server extracts the header and sends a demographics resolution request to the identified server IP address. The distributed demographic server is presented with the obscure key or encrypted data and responds with the appropriate information for selection of an electronic advertisement, such as data indicative of correlation between subscriber and demographic information. Security is maintained by encrypting the inserted header using an encryption key that is known only to the carrier and/or the advertisement provider. The carrier may provide a different encryption key for each advertisement provider.

FIG. 1 shows one embodiment of a data communication system 101 (hereinafter referred to as "system 101"). The system 101 is an Internet protocol based system, an Intranet system, a telephony system, a cellular based system, a wireless or wired audio/visual data communication system, and/or any known or future data communication system.

The system 101 includes, but is not limited to, a user device 100, a device 104, a device 108, a sever 112, and a sever 116, and a device 120. Additional, different, or fewer components may be provided. For example, a proxy server, a billing server, a name server, a router, a switch or intelligent switch, a computer or workstation, administrative components, such as an administrative workstation, a gateway device, a backbone, ports, network connections, and network interfaces may be provided. The different components of the system 101 are connected via the Internet, an intranet, a local area network ("LAN"), a wide area network ("WAN"), a virtual private network ("VPN"), and/or any known or future network. Wired and/or wireless connections may be provided. While the components in FIG. 1 are shown as separate from one another, one or more of these components may be combined.

The user device 100 is a wireless device (e.g., a cell phone, a PDA, a wireless computer), a wired or cabled device (e.g., a desktop computer using a broadband cable or DSL connection), or any other data communication device that can be operated by a user. A user uses the user device 100 to view websites or other digital forums, view messages, check email, initiate or receive phone calls, access the Internet, intranet, or other networks, and/or perform any other data processing. For example, the device 100 is a 2G or 3G cellular phone using a global system for mobile communications ("GSM"), wideband code division multiple access ("WCDMA"), or any other modulation or transmission scheme.

The user device 100 includes a display 124, a processor 128, and a memory 132. Additional, different, or fewer components may be provided. For example, an input device is provided, such as a button, keypad, keyboard, mouse, trackball, rocker switch, touch pad, or voice recognition circuit. Audio components may be provided. For example, a speaker, audio jacks, and/or other components for outputting or receiving audible or sound signals are provided. The processor 128 is in communication with the display 124 and the memory 132. The processor 128 may be in communication with more or fewer components. The processor 128 is a general processor, application-specific integrated circuit ("ASIC"), digital signal processor, field programmable gate array ("FPGA"), digital circuit, analog circuit, or combinations thereof. The processor 128 is one or more processors operable to control and/or communicate with the various electronics and logic of the user device 100. The processor 128, the memory 132, and other circuitry may be part of an integrated circuit.

The processor 128 is operable to generate a request 176, such as a GET request. The request 176 may be a request for a webpage. Other data content may be requested over the network, such as an audio and/or video file, email content, or other data files or messages. The request 176 includes one or more data packets or other information indicating a desire for content. The processor is also operable to receive and process a response 180. The response 180 includes one or more data packets or other information retrieved from servers, databases, or other network devices or systems based on the request 176 or other requests. The processor 128 is operable to display data related to the response 180 via the display 124 and operable to select and send some or all data related to the response 180 to the memory 132 for storage.

The display 124 is any mechanical and/or electronic display positioned for accessible viewing in, on, or in communication with the device 100. For example, the display 124 is a touch screen, liquid crystal display ("LCD"), cathode ray tube ("CRT") display, or a plasma display. The display 124 is operable to display websites, Internet forums, and other data as well as associated electronic advertisements, such as banner advertisements on webpages.

The memory 132 is any known or future storage device. The memory 132 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 132 may be part of the processor 128.

The user device 100 is operable to communicate with the device 104. For example, the user device 100 transmits the request 176 to the device 104, and the user device 100 receives the response 180 from the device 104. The device 104 is a network access server, a gateway device, and/or any other device operable to receive or intercept data packets over a network. For example, the device 104 is a network access server, a gateway general packet radio service ("GPRS") support node, and/or an authentication, authorization, and accounting ("AAA") server. The device 104 determines whether the user device 100 is authorized to use the provider's network and/or calculates or accounts for usage cost and billing information. Alternatively, the device 104 is a switch, an intelligent switch, or router controlling connections between the user device 100 and external networks.

The device 104 includes a processor 140 and a memory 136. Additional, different, or fewer components may be provided. The processor 140 is in communication with the memory 136. The processor 140 may be in communication with more or fewer components. The processor 140 is a general processor, application-specific integrated circuit ("ASIC"), digital signal processor, field programmable gate array ("FPGA"), digital circuit, analog circuit, or combinations thereof. The processor 140 is one or more processors operable to control and/or communicate with the various electronics and logic of the device 104 and/or the system 101. The processor 140, the memory 136, and/or other circuitry may be part of an integrated circuit. The processor 140 is operable to insert or include data in a request, such as the request 176.

The memory 136 is any known or future storage device. The memory 136 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 136 may be part of the processor 140.

The device 104 is positioned between the user device 100 and the devices 112, 116, and/or 120. Requests and responses, such as the request 176 and the response 180, flowing to and from the device 100 pass through the device 104. Alternatively, the device 104 is positioned at any other location within a common or external network (e.g., the device 104 is implemented by one or both of the devices 112, 116).

Figure 2:
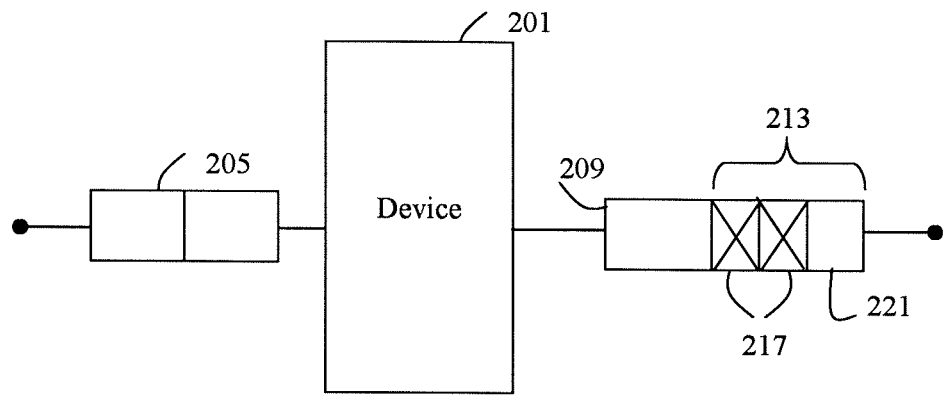
FIG. 2 illustrates one embodiment of a device of a system similar to the system of FIG. 1.

The device 104 is operable to intercept or receive a request, such as the request 176, from the user device 100. The device 104 is also operable to alter, modify, or filter one or more data packets or insert information in one ore more data packets of the request. For example, FIG. 2 shows one embodiment of a device 201. The device 201 is a network access server or a gateway device, such as the device 104. The device 201 may be similar to or different than the device 104. The device 201 is operable to monitor data communication between a user device and a server. For example, the device 201 receives a request 205 for content. The request 205 includes one or more data packets indicating a desire to retrieve a website or other content. The content is associated with an electronic advertisement. For example, the website or other content requested includes or designates portions to an electronic advertisement.

The device 201 is able to read, analyze, modify, include, or generate existing or new information in the request 205. For example, the device 201 includes or inserts data 213 in the request 205 to generate a request 209. The data 213 includes user data 217 and an indicator 221. The user data 217 and the indicator 221 are inserted in a header of a data packet, such as a hypertext transfer protocol ("HTTP"), Internet protocol ("IP"), transmission control protocol ("TCP"), real time streaming protocol ("RTSP"), extensible markup language ("XML"), or other application header. The user data 217 is personal information of a subscriber or user. The personal information may include a name, address, city of origin, user interests, income, age information, or other user information. The user data 217 may be encrypted. Other data associated with the request may be encrypted as well. Alternatively, the user data 217 is an IP address, media access control ("MAC") address, or Ethernet hardware address ("EHA") of the user or the user device, such as the user device 100. The indicator 221 indicates where at least the user data 217 is to be sent to. For example, the indicator 221 is an IP address of one of a plurality of demographic servers or databases.

The device 104 is operable to communicate with the device 108. The device 108 includes a memory 144 and a processor 148. Additional, different, or fewer components may be provided. The memory 144 and the processor 148 are similar to or different than the memory 136 and the processor 140, respectively. The device 108 is a database, server, or any other device that generates a key sequence or data to be inserted into a request, such as the request 176 or 205. For example, the device 108 is a HLR, AAA, or LDAP database. The device 108 gathers or stores subscriber information in the form of user data, such as the user data 217. The device 108 may also encrypt the user data to form an obscure key or key sequence. The device 108 may also include IP addresses of a plurality of demographic servers or databases as well as correlation data between the IP addresses and different subscribers or users.

The device 104 is operable to query the device 108 to retrieve data, such as the user data 217 and/or the indicator 221, to insert or include in a request, such as the request 176 or 205. Alternatively, the device 108 is implemented by the device 104 or is part of the device 104. For example, the processors and memories are shared or combined.

The device 104 is also operable to communicate with the sever 112. The sever 112 is a provider server, an application server, communications server, database server, proxy server, file server, web server, client server, peer-to-peer server, and/or any known or future server. The server 112 is operable to receive content requests, such as a GET request for a webpage, and gather and/or provide content or links to content, such as links to electronic advertisements, to the user device 100. The server 112 gathers information to respond to the request, such as html content, tags, and/or links. The server 112 may gather the requested content from other servers, a cache, or other network devices. For example, the server 112 communicates with the server 116 to acquire advertisement content associated with the requested webpage.

The server 112 is a software and/or hardware implementation. For example, the server 112 is an application program. Alternatively, the server 112 is a server computer or any other hardware that executes and runs server applications. A hardware implementation of the server 112 includes, but is not limited to, a memory 152 and a processor 156. Additional, different, or fewer components may be provided. The processor 156 is in communication with the memory 152. The processor 156 may be in communication with more or fewer components. The memory 152 and the processor 156 are similar to or different than the memory 132, 136, or 144 and the processor 128, 140, or 148, respectively.

The server 116 is operable to communicate with the server 112 and/or the device 104. The server 116 is an advertisement server, a proxy server, and/or any known or future server. For example, the server 116 is an advertisement server. The server 116 is operable to receive electronic advertisement requests, such as a request for an advertisement on a webpage, and gather and provide the advertisement content to the device 100 or any other device or server of the system 101. The server 116 is implemented on separate hardware from or implemented on the same hardware as the server 112.

The server 116 is a software and/or hardware implementation. For example, the server 116 is an application program. Alternatively, the server 116 is a server computer or any other hardware that executes and runs server applications. A hardware implementation of the server 116 includes, but is not limited to, a processor 160 and a memory 164. Additional, different, or fewer components may be provided. The processor 160 and the memory 164 have the same structure as or different structure than the processor 156 and the memory 152, respectively.

The server 116 is operable to receive a request with included data, such as the request 209. For example, the server 116 may not be able to analyze or view encrypted data, such as the user data 217. The server 116 is operable to view an indicator, such as the indicator 221, and send at least a portion of the request, such as the user data 217, to another device as a function of the indicator. For example, the indicator is an IP address of one of a plurality of demographic devices, and the server 116 sends the user data 217 to the demographic device associated with the IP address.

The device 120 is operable to communicate with the server 116. The device 120 is one of a plurality of demographic devices, such as demographic servers. The device 120 includes demographic information, such as census or demographic data related to a location or site associated with the device 120. The device 120 is a software and/or hardware implementation. For example, the device 120 is an application program. Alternatively, the device 120 is a server computer or any other hardware that executes and runs server applications. A hardware implementation of the device 120 includes, but is not limited to, a processor 168 and a memory 172. Additional, different, or fewer components may be provided. The processor 168 and the memory 172 have the same structure as or different structure than the processor 128, 140, 148, 156, or 160 and the memory 132, 136, 144, 152, or 164, respectively. The device 120 is implemented on separate hardware from or implemented on the same hardware as the server 116.

The device 120 is operable to receive at least a portion of a request with included data, such as the user data 217, as a function of an indicator in the request, such as the indicator 221. The device 120 is operable to analyze the user data 217, including decryption of encrypted data, and correlate the user data with demographic information via the processor 168. The device 120 may gather and store demographic information, such as in the memory 172, for several subscribers or users. For example, census studies, retail customer information, and other demographic data may be uploaded to websites or databases, and such data may be uploaded to or accessible by the device 120.

Figure 3:
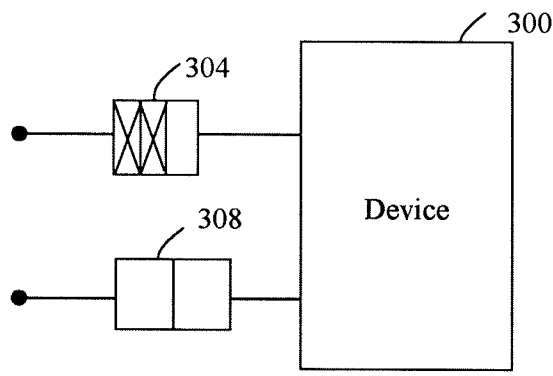
FIG. 3 illustrates one embodiment of another device of a system similar to the system of FIG. 1.

FIG. 3 shows one embodiment of a device 300. The device 300 is one of a plurality of demographic devices, such as the device 120. The device 300 is similar to or different than the device 120. The device 300 is operable to receive at least a portion of a request, such as user data 304, as a function of an included indicator, such as the indicator 221. More or less data or information of a request may be received. The user data 304 is similar to the user data 217. In one embodiment, the user data 304 is encrypted. Other data of the request may be encrypted as well. The device 300 decrypts the user data 304 and correlates demographic information with the encrypted user data. Alternatively, the user data 304 is not encrypted. The device 300 is operable to generate one or more data packets, flags, indicators, or other data 308 that corresponds to a type of advertisement. The device 300 is operable to transmit the data 308 to an advertisement sever, such as the server 116. The server 116 uses the data 308 to select an advertisement.

For example, a user or subscriber requests a webpage via a user device, such as the user device 100. An initial or secondary request for the webpage or an electronic advertisement that can be included in the webpage is received by a network access server or gateway device, such as the device 104 or 201. The network access server or gateway device inserts personal subscriber information, such as the user data 217 or 304, into an HTTP header or any other header of the initial and/or secondary request. The personal subscriber information may or may not be encrypted. The network access server or gateway device also inserts an indicator, such as the indicator 221, indicative of one of a plurality of demographic devices, such as the device 120 or 300, in the header. An advertisement server, such as the server 116, receives some or all of the included data or the entire request with included data. The advertisement server sends at least the personal subscriber information to a demographic device, such as the device 120 or 300, based on the included indicator. The demographic device analyzes the personal subscriber information. For example, the demographic device decrypts the received data. The demographic device then correlates or identifies stored or gathered demographic information, such as census data or local shopping preferences, with the personal subscriber information. The demographic device queries the advertisement server to select an electronic advertisement as a function of the correlation or identification of the demographic information.

Figure 4:
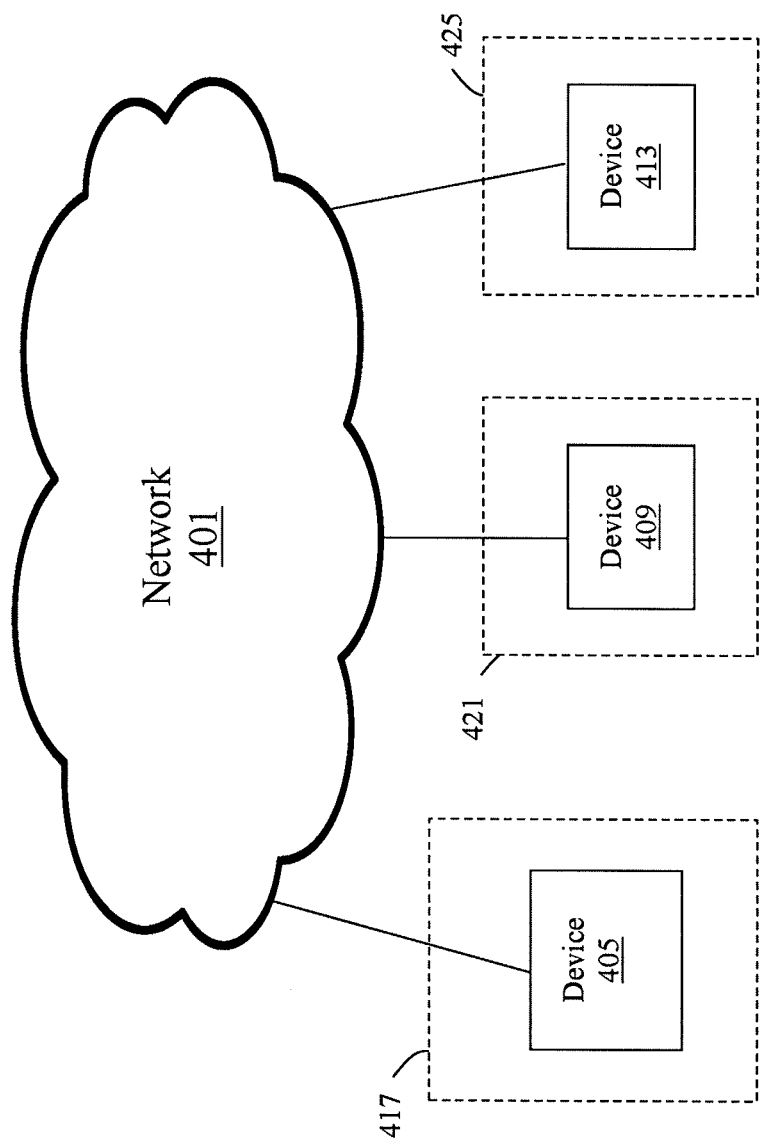
FIG. 4 illustrates another embodiment of a distributed demographic system.

FIG. 4 shows another embodiment of a distributed demographic system. The system includes a network 401, a device 405, a device 409, and a device 413. Additional, different, or fewer components may be provided. The network 401 is the Internet, an intranet, a local area network ("LAN"), a wide area network ("WAN"), a virtual private network ("VPN"), and/or any known or future network. The devices 405, 409, and 413 are a plurality of demographic devices or servers, such as the device 120 or 300. Each of the devices 405, 409, and 413 are at different locations to accommodate separate users or subscribers, respectively. For example, the device 405 is located at site 417, the device 409 is located at site 421, and the device 413 is located at site 425. The different sites represent different geographic locations, such as different areas of a city, different cities, different political or geographical regions, or different states or countries.

Because the demographic devices are distributed, less data can be stored or processed at each of the demographic devices. For example, each demographic device includes separate demographic information corresponding to users or subscribers located in or near the respective site. Also, less data can be stored or gathered because personal subscriber information is being supplied to each of the demographic devices via advertisement requests. Alternatively, some or all demographic devices may include demographic information based on criteria other than geographical location.

Each of the demographic devices is associated with one or more advertisement servers in the network 401. Because the demographic devices are distributed, the advertisement servers may include less advertisement data. For example, an advertisement server may only store or process advertisements associated with the demographic subscriber or user information of a respective demographic device. Therefore, a user receives selected advertisements based on one of the plurality of demographic devices corresponding to the user.

A carrier may sell or license the demographic devices to one or more advertisement providers. Alternatively, the carrier may control the demographic devices based on implementation agreements between the carrier and advertisement providers.

Figure 5:
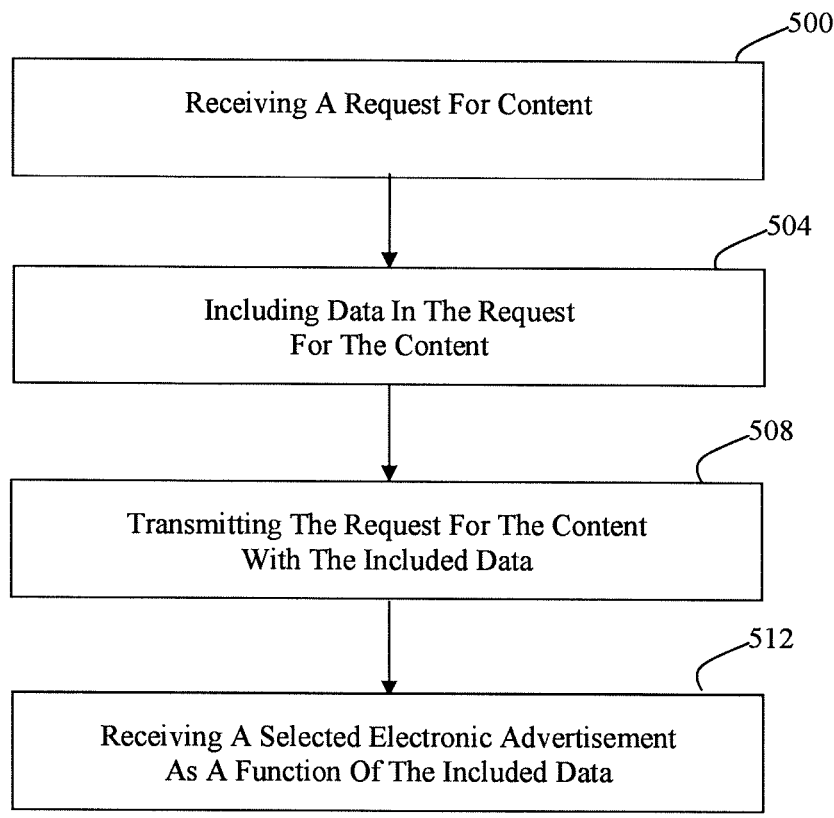
FIG. 5 illustrates one embodiment of a method for distributed demographic electronic advertising.

FIG. 5 is a flowchart of one embodiment of a method for distributed demographic electronic advertising. Fewer or more acts may be provided. The method is implemented by the system and/or devices of FIGS. 1-4 or a different system.

In act 500, a request for content is received or intercepted, such as by the device 104. Content may be data, files, or other digital information that can flow between entities over one or more networks. Content may include a website or other Internet/network applications or data. For example, a user turns on or enables a wireless or wired device, such as the user device 100. The user requests data content over a network with the user device 100. The user may request a webpage, a file, or other data over the network. The requested content is associated with or is capable of including an electronic advertisement. For example, the user types a uniform resource locator ("URL") via the user device 100 to request a webpage that displays electronic advertisements, such as banner advertisements, interactive advertisements, or full screen advertisements. As another example, the user selects a link shown on a display, such as the display 124. The user device 100 communicates with a name server, such as the server 112 or other server, to obtain an IP address associated with the URL. Then, the user device 100 sends a request, such as the request 176 or 205, over the network or system, such as the network 401 or system 101, to retrieve the webpage. A device, such as a network access server, a gateway device, and/or the device 104, intercepts or receives the request. Other network protocols may be used for acquiring content.

In act 504, data, such as the data 213, is included in the request for the content. The device that receives or intercepts the request, as in act 500, includes or inserts additional data in the request, such as in a header of some or all data packets. The data includes data corresponding to user information, such as the user data 217, and data or an indicator, such as the indicator 221, indicative of a first of a plurality of demographic devices, such as the device 120, the device 300, the device 405, the device 409, or the device 413. The data corresponding to user information may comprise personal information of a subscriber, such as name, income, location or address (such as a zip code), and/or age information. Alternatively, the data may comprise an IP or MAC address of the user device. The data or an indicator indicative of a first of a plurality of demographic devices may comprise an IP address associated with the first demographic device. The appropriate IP address may be selected based on a look-up-table or other correlation that links a user or subscriber with a specific demographic device or server. For example, a user or subscriber may be associated with a demographic device or server based on where the user or subscriber lives, such as a home address, current location of the user or subscriber when making a request (e.g., roaming), a time of a request, and/or any other information. The data to be included can be obtained through RADIUS authentication and/or dynamic host configuration protocol ("DHCP") registration. The receiving device, such as the device 104 or 201, may obtain the data via a database or other device, such as the device 108. Insertion of the included data may be inserted in all requests for data content. Alternatively, the data is inserted in only requests specific to retrieval of electronic advertisements.

Some or all of the included data may be encrypted. For example, user or subscriber data, such as the user data 217 or 304, is encrypted using any known or future encryption techniques. The encryption is completed in a subscriber database or device, such as the device 108. Alternatively, a network access server or gateway device, such as the device 104 or 201, may encrypt subscriber or user data before insertion into an outgoing request. Different encryption codes or keys may used for different users or subscribers, respectively. Also, the encryption for the included data may be periodically changed for security purposes.

In act 508, the request for the content with the included data, such as the request 209, is transmitted. For example, the modified request is sent to a server, such as the server 112, to retrieve content, such as webpage content. The server transmits the requested content back to the device that included the additional data to send the requested content, such as the response 180, to the user or user device. Typically, when a GET request is received by a server, such as the server 112, the server retrieves and sends html code, tags, and/or links to the user device 100. One of the links may be for requesting an advertisement, and, therefore, the user device 100 transmits a second request to retrieve the advertisement content from a server, such as the server 116. Alternatively, the advertisement content is sent to the user device 100 based on the first request. In either case, a request for an electronic advertisement is sent to an advertisement server, such as the server 116.

For example, at least one part or a portion of a request for an electronic advertisement is received by a server, such as an advertisement server and/or the server 116. The part or portion of the request is the included data, such as the user data 217 and/or the indicator 221. Some or all of the included data may be encrypted. For example, encrypted user data, such as the user data 217, is not accessible or viewable by the advertisement server (e.g., by keeping the user data hidden from the advertisement server, superfluous or undesired advertisements sent to a user may be prevented). Therefore, the advertisement server sends the encrypted user data to a demographic device as a function of the indicator indicative of the demographic device. Alternatively, the advertisement server decrypts the encrypted user data and queries the demographic server as a function of the decrypted data. Or, the user data is not encrypted, and the advertisement server sends the user data to the demographic device for correlation. Based on the user data, the demographic device queries the advertisement server to select an appropriate electronic advertisement.

In act 512, a selected electronic advertisement is received. After the advertisement server selects the appropriate electronic advertisement, the electronic advertisement is sent to the network access server, the gateway device, or the device that included the additional data, such as the device 104 or the device 201. The electronic advertisement is then transmitted to the user device, such as the user device 100. Alternatively, the selected electronic advertisement is sent to the user or user device via a different data path.

Figure 6:
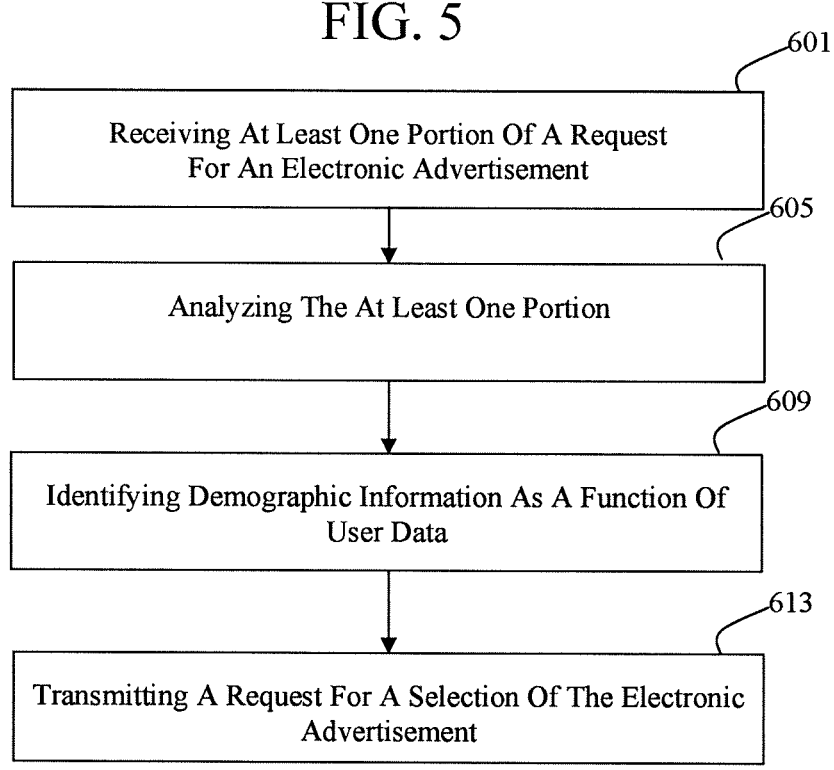
FIG. 6 illustrates one embodiment of another aspect of a method for distributed demographic electronic advertising.

FIG. 6 is a flowchart of one embodiment of another aspect of a method for distributed demographic electronic advertising. Fewer or more acts may be provided. The method is implemented by the system and/or devices of FIGS. 1-4 or a different system.

In act 601, the at least one part or portion of a request for an electronic advertisement is received by a demographic device of a plurality of demographic devices, such as the device 120, 300, 405, 409, or 413, based on the indicator in the request. For example, encrypted or non-encrypted user data is received. Alternatively, an IP or MAC address associated with the user device is received.

In act 605, the at least one part or portion is analyzed. For example, the demographic device decrypts encrypted user data to view personal subscriber information, such as income, name, address, age, etc. Any known or future decryption technique may be utilized. Alternatively, the demographic device views, reads, or processes the user data without decryption.

In act 609, demographic information is identified as a function of the user data. The demographic device correlates the user or subscriber data with demographic information. The demographic device may correlate consumer preferences or likely shopping choices known form demographic data with the income, address, age, name, or other user information received. For example, if the income information is in a certain category, then the demographic device will determine what are the likely items or materials a person in this income stage would purchase. The demographic device may also include more user or subscriber information to correlate with demographic data in instances where the received user data does not contain personal information, such as an IP or MAC address.

In act 613, a request for a selection of the electronic advertisement as a function of the identified or correlated demographic information is transmitted. For example, after the demographic device determines or identifies the appropriate demographic information, such as preferences, the demographic device generates one or more data packets, flags, keys or key sequences, bits, or other data, such as the data 308, that can be used to query the advertisement server to select an advertisement based on the identified demographic data. The advertisement server selects an appropriate electronic advertisement and sends it to the user. This way, advertisements are selected specific to each user or subscriber. In alternative embodiments, the demographic device selects specific advertisements based on the identified demographic data.

The logic, software or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for distributed demographic electronic advertising
   comprising:
   receiving, at a demographic server, at least one portion of a request for an electronic advertisement from a user device, the request including an indicator indicative of the demographic server, wherein the demographic server is one of a plurality of demographic servers and each of the plurality of demographic servers is associated with a separate geographic location;
   analyzing user data included in the request;
   identifying demographic information as a function of the user data; and
   transmitting a request for a selection of the electronic advertisement as a function of the demographic information,
   wherein the indicator comprises an obscure key transmitted by remote authentication dial in user service.

2. The method of claim 1, wherein receiving the at least one portion comprises receiving encrypted user data.

3. The method of claim 2, wherein the encrypted user data comprises personal information of a subscriber, the personal information including name, address, income, or age information.

4. The method of claim 3, wherein identifying demographic information comprises correlating gathered demographic data with the personal information.

5. The method of claim 4, wherein transmitting the request for the selection of the electronic advertisement comprises sending an identifier to an
   advertisement server, the identifier indicative of a type of advertisement corresponding to the correlated demographic data.

6. The method of claim 2, wherein analyzing the user data comprises decrypting the encrypted user data.

7. The method of claim 2, wherein the encrypted user data is in a header of the request.

8. The method of claim 1, wherein an IP address of the demographic server is included in a header of the request.

9. A method comprising:
   monitoring, by a network device, communications between a user device and a server, wherein the communications include a request for content;
   receiving, by the network device, the request for content from the user device, the content associated with an electronic advertisement;
   including user data in the request for the content, the user data corresponding to user information and indicative of one of a plurality of demographic devices, each of the plurality of demographic devices including separate demographic information distributed according to respective geographic locations;
   transmitting the request for content and the user data to the one of the plurality of demographic devices selected based on a geographic location of the user device; and
   receiving a selected electronic advertisement from the one of the plurality of demographic devices.

10. The method of claim 9, wherein the user data comprises an IP address of the one of the plurality of demographic devices, the IP address in a header of the request.

11. The method of claim 9, further comprising: including personal information of a subscriber in the user data.

12. The method of claim 11, wherein the personal information is encrypted, and wherein including data comprises inserting the encrypted personal information in a header of the request.

13. The method of claim 11, wherein the selected electronic advertisement is selected based on the personal information.

14. An apparatus operable to monitor data communication between a user device and a server, the apparatus comprising:
    a memory configured to store a lookup table correlating each of a plurality of demographic servers with a geographic location; and
    a controller configured to receive a request for content, the content including an electronic advertisement, the controller configured to access the lookup table using a user device geographic location obtained from the request for content, and the controller configured to insert data in the request for content, the inserted data indicative of one of the plurality of demographic servers associated with the user device location as correlated by and retrieved from the lookup table.

15. The apparatus of claim 14, wherein the controller is further configured to include personal information of a subscriber in the request, the personal information used to identify demographic information associated with the plurality of demographic servers.

16. The apparatus of claim 15, wherein the controller is further operable to receive a selected electronic advertisement as a function of the identified demographic information.

17. The apparatus of claim 14, wherein the apparatus comprises a network access server or a gateway device.

18. The apparatus of claim 14, wherein each of the plurality of demographic servers is associated with a different set of demographic data.

19. A non-transitory computer readable storage medium containing instructions when executed operable to:
    receive a request for content from a user device, wherein the content includes a user address associated with the user device;
    query a database using the user address to identify a demographic server associated with the user device;
    generate a request for advertisement by inserting an internet protocol address of the demographic server into a header of the request for content;
    send the request for advertisement to the demographic server; and
    send the request for content to a content server.

20. The non-transitory computer readable storage medium of claim 19, further comprising instructions when executed further operable to:
    insert a key associated with the user device into the request for advertisement.

21. The method of claim 9, wherein the user data includes a hardware address of a user device.

22. The method of claim 9, wherein the user data comprises an obscure key transmitted by remote authentication dial in user service.

23. The method of claim 14, wherein the inserted data comprises an obscure key or encrypted data used to query at least one of the plurality of demographic servers.

\* \* \* \* \*